United States Patent [19]

Hedges et al.

[11] 4,258,789
[45] Mar. 31, 1981

[54] COSURFACTANT BLENDS FOR OIL RECOVERY SURFACTANT SYSTEM

[75] Inventors: James H. Hedges; Gilbert R. Glinsmann, both of Bartlesville, Okla.

[73] Assignee: Phillips Petroleum Company, Bartlesville, Okla.

[21] Appl. No.: 71,609

[22] Filed: Aug. 31, 1979

[51] Int. Cl.$^3$ .................................. E21B 43/22
[52] U.S. Cl. .................................. 166/252; 166/273; 166/274; 252/8.55 D
[58] Field of Search .................... 166/252, 273–275; 252/8.55 D

[56] References Cited

U.S. PATENT DOCUMENTS

| | | | |
|---|---|---|---|
| 3,493,048 | 2/1970 | Jones | 166/252 |
| 3,885,628 | 5/1975 | Reed et al. | 166/252 |
| 4,066,124 | 1/1978 | Carlin et al. | 166/252 |
| 4,079,785 | 3/1978 | Hessert et al. | 252/8.55 D X |
| 4,122,895 | 10/1978 | Sitton et al. | 166/252 |
| 4,125,156 | 11/1978 | Glinsmann | 166/273 X |

Primary Examiner—Stephen J. Novosad

[57] ABSTRACT

A first and second series of aqueous surfactant-cosurfactant-electrolyte systems are prepared at varying electrolyte concentrations using, respectively, a relatively water insoluble cosurfactant and a relatively water soluble cosurfactant. The resulting systems are mixed with oil to be displaced or its equivalent and allowed to equilibrate so as to determine the salinity at which the microemulsion phases formed on said equilibration have approximately equal volumes of oil and water, thus giving the optimal salinity concentration for each surfactant-cosurfactant combination. Similar equilibrations are made using at least one surfactant system which employs a cosurfactant of intermediate water solubility. These systems are then used under the same or similar conditions to displace oil at the optimal salinity for each system and the resulting oil recovery percentage is plotted versus the salinity. Thereafter using the relationship that increasing the more water soluble component of the cosurfactant increases the optimum salinity value and vice versa, a cosurfactant blend is prepared so as to give a system which has an optimum salinity essentially corresponding to the unique salinity.

8 Claims, 10 Drawing Figures

COSURFACTANT BLENDS FOR OIL RECOVERY SURFACTANT SYSTEM

BACKGROUND OF THE INVENTION

This invention relates to a surfactant system for recovery of oil from a subterranean reservoir.

It has long been known that the primary recovery of oil from a subterranean formation leaves a substantial amount of the oil still in the formation. This has led to the use of what is commonly referred to as secondary recovery or waterflooding wherein a fluid such as brine is injected into a well to force the oil from the pores of the reservoir toward a recovery well. However, this technique also leaves substantial amounts of oil in the reservoir, so-called residual oil, because of the capillary retention of the oil. Accordingly, surfactant systems have been employed either in place of the secondary recovery or more generally in a tertiary recovery process. One particularly suitable type of surfactant system is that which results in the formation of a microemulsion which is immiscible with the oil it is displacing. Such microemulsion systems are very effective in removing residual oil.

The surfactant systems employed to produce microemulsion type oil recovery basically contain at least three separate ingredients, brine, a surfactant and a cosurfactant. It is disclosed in Glinsmann, U.S. Pat. No. 4,125,156, issued Nov. 14, 1978, how to systematically optimize a system so as to give a combination of surfactant, cosurfactant and brine which produce low interfacial tension which is associated with good oil recovery.

Since these values are obtained as disclosed in said Glinsmann patent by plotting oil recovery, interfacial tension and volume fraction of equilibrated phases versus salinity, the salinity at which minimum interfacial tension is achieved has been considered the optimum (optimal) salinity. However, the minimum interfacial tension does not necessarily correlate exactly with maximum oil recovery. Also, different systems with theoretically similar characteristics exhibit drastically different results in practical applications in test cores or actual use. Finally, it occurs in some instances that a cosurfactant of the desired solubility simply does not exist or is not readily available at an economical price.

SUMMARY OF THE INVENTION

It is an object of this invention to more precisely optimize a surfactant system so as to correlate with actual oil recovery;

It is a further object of this invention to systematically produce an optimized system which is resistant to debilitating effects in the actual reservoir such as dilution of the cosurfactant; and It is yet a further object of this invention to provide a method for determining a cosurfactant blend having the exact characteristics for optimized oil recovery for a particular system.

In accordance with this invention, optimal salinities for surfactant systems having cosurfactants of varying water solubility are determined, the resulting systems are used to recover oil from cores, the percentage oil recovery is plotted versus the optimal salinity to locate the optimal salinity corresponding to maximum oil recovery, herein designated as unique salinity, and a surfactant system is prepared containing a mixture of cosurfactants which gives an optimal salinity equal to or near this unique salinity.

BRIEF DESCRIPTION OF THE DRAWINGS

In the drawings, forming a part hereof.

DESCRIPTION OF THE PREFERRED EMBODIMENTS

The optimal salinity can be obtained as described in said Glinsmann patent, U.S. Pat. No. 4,125,156, the disclosure of which is incorporated herein by reference. However, this is sufficiently complex that a brief summary is appropriate at this point.

Figure 1:
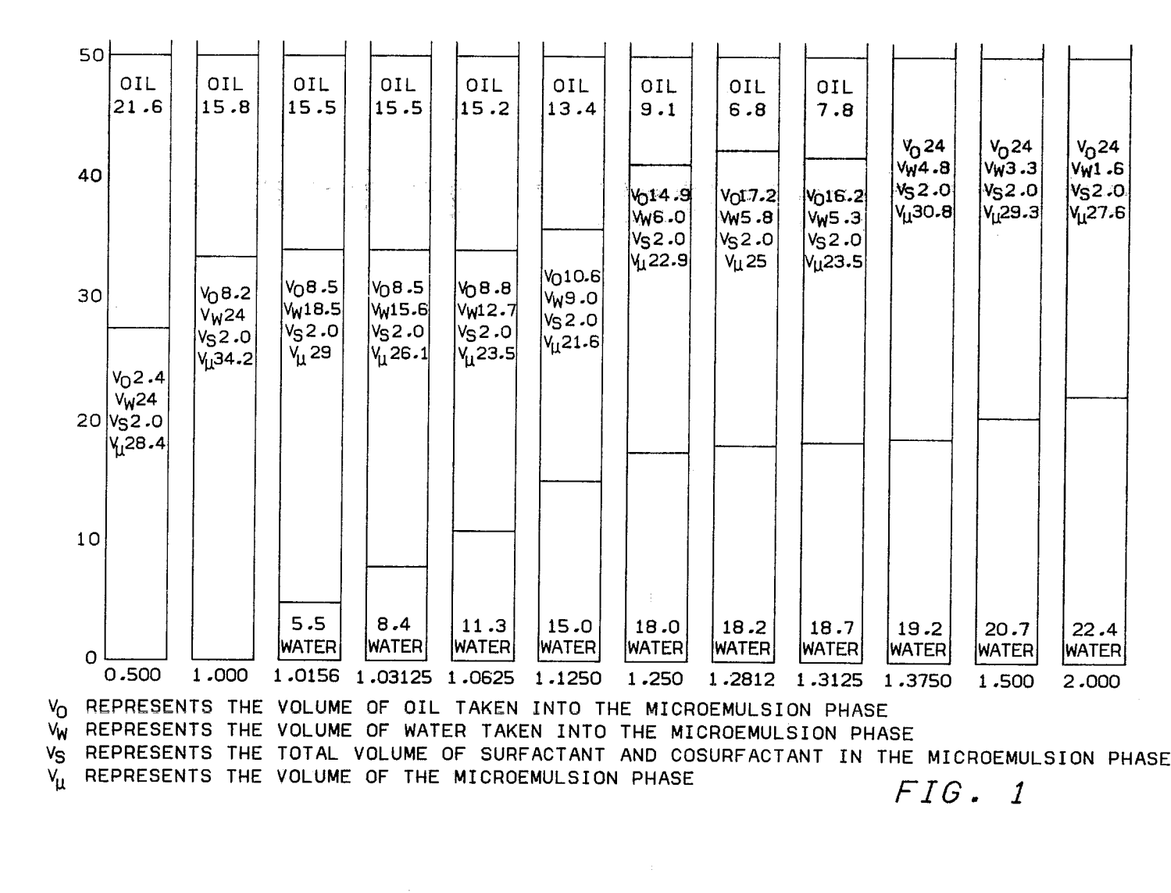
FIG. 1 shows the relationship between the various phases on equilibration of a surfactant system with oil at varying salinities.

A series of surfactant-cosurfactant-electrolyte-water systems are prepared differing only in salinity. Each of these systems is then mixed with crude oil or a pure hydrocarbon preferably simulating oil from the reservoir to be flooded, for instance, by shaking in a ground glass-stoppered graduated cylinder, and allowed to equilibrate. FIG. 1 shows the composition and the volumes of the different phases from a typical series of such equilibrations. Preferably, the surfactant system is mixed with an equal volume of oil so that the point at which equal volumes of oil and water are taken up into the middle microemulsion phase can easily be determined simply by measuring the volume of water remaining below and the volume of oil remaining above. As can be seen from FIG. 1, at very low salinities, a two-phase system is obtained, a lower water rich (so-called gamma type) microemulsion phase in equilibrium with a predominantly oil upper phase. At high salinities, a two-phase system, a lower predominantly water phase in equilibrium with an upper oil rich (so-called alpha type) microemulsion phase is obtained. At the intermediate salinities, both oil and aqueous phases exist in equilibrium with a middle (so-called beta type) microemulsion phase. In general, the minimum interfacial tension is associated with those systems which take up about equal volumes of oil and water into the microemulsion phase. In contrast to the behavior shown in FIG. 1, some systems will exhibit behavior wherein the middle phase rather than the upper phase will diminish in volume in the beta to alpha transition region. This in general does not interfere with the optimal salinity determination.

Figure 2A:
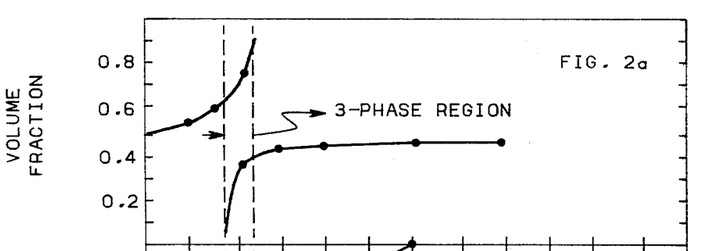
FIG. 2 shows the prior art understanding of the relationships between phase behavior, interfacial tension, and maximum oil recovery.
Figure 2B:
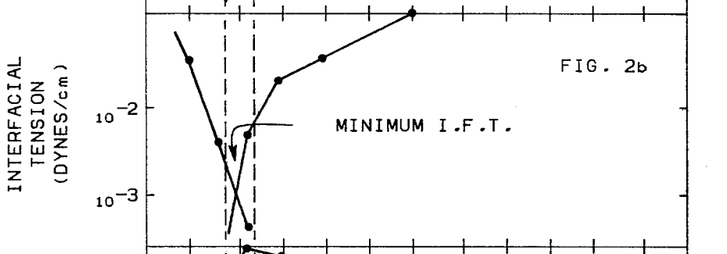
Figure 2C:
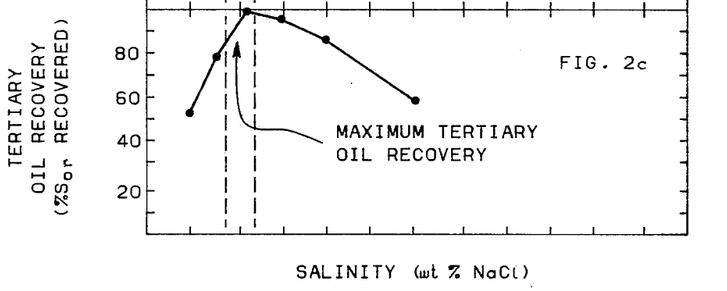

FIG. 2a plots the phase volume systems of FIG. 1 so that they can be represented graphically. FIG. 2b shows a similar plot with the minimum interfacial tensions superimposed on the graph. FIG. 2c shows a similar plot with the oil recovery obtained by utilizing these sytems superimposed thereon. As can be seen from FIGS. 2b and 2c, the minimum interfacial tensions and the maximum oil recovery appear to coincide within the three phase region and, as noted hereinabove, these are generally associated with equal volumes ofoil and water uptake into the microemulsion.

Thus, the composition which gives approximately equal volumes of oil and water uptake into the microemulsion, the optimal salinity was considered in the prior art to be the best salinity for maximum oil recovery.

Figure 3:
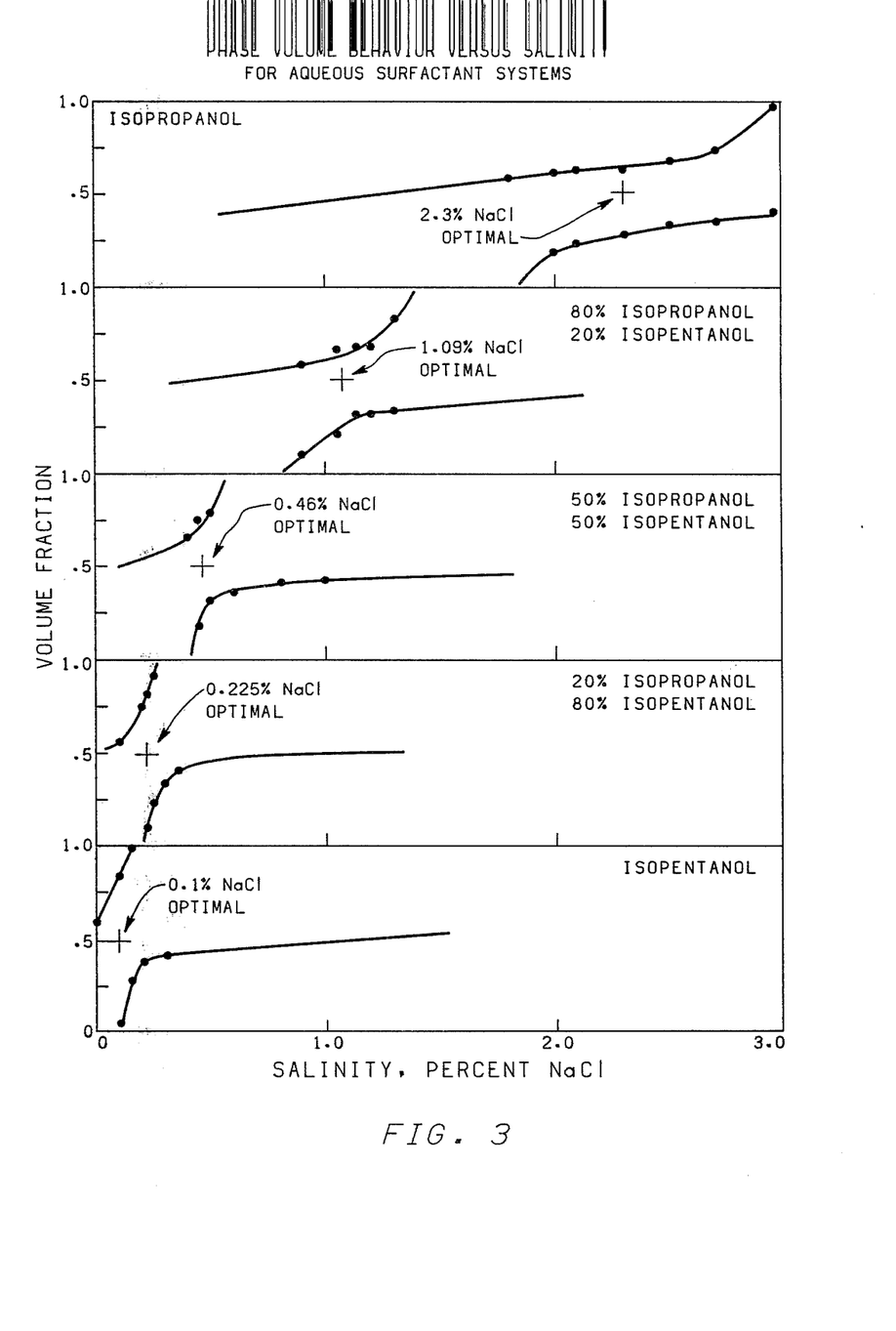
FIG. 3 shows phase volume behavior for systems using blends of cosurfactants.

FIG. 3, which is a series of phase volume diagrams similar to FIG. 2a, shows a high optimal salinity for a system utilizing a relatively water soluble alcohol such as isopropyl alcohol, a low optimal salinity for an identical system except for the use of a relatively water insoluble cosurfactant such as isopentanol, and intermediate optimal salinities for systems utilizing a blend of the two alcohols. This figure shows the relationship that, as the percentage of relatively water soluble cosurfactant increases, the optimal salinityincreases and as the percentage of relatively water soluble cosurfactant decreases, the optimal salinity decreases. In FIG. 3, the oil was n-decane, the surfactant was 3 weight percent active TRS 10-410, a commercially available petroleum sulfonate from Witco Chemical Company, and the concentration of the cosurfactant blend was 3 weight percent.

Figure 4:
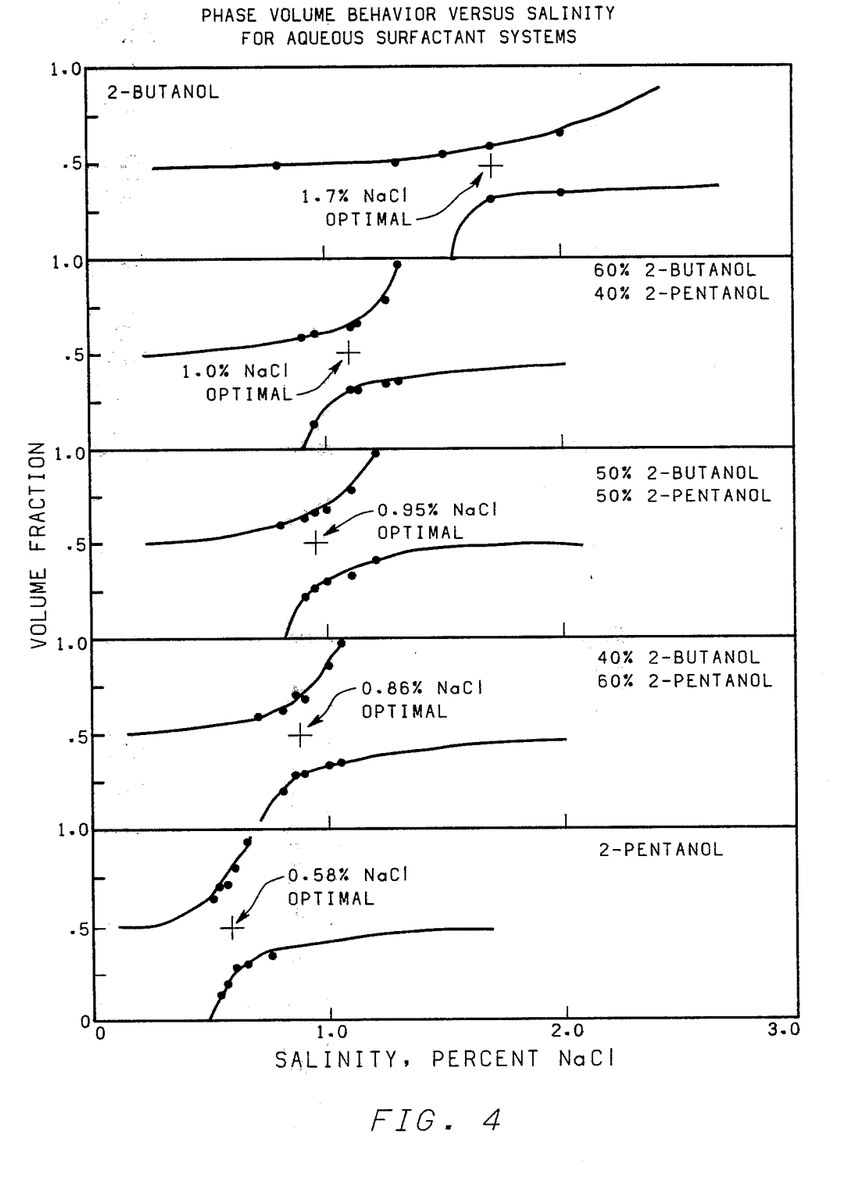
FIG. 4 is a Figure similar to FIG. 3 utilizing different blends of cosurfactants.
Figure 5:
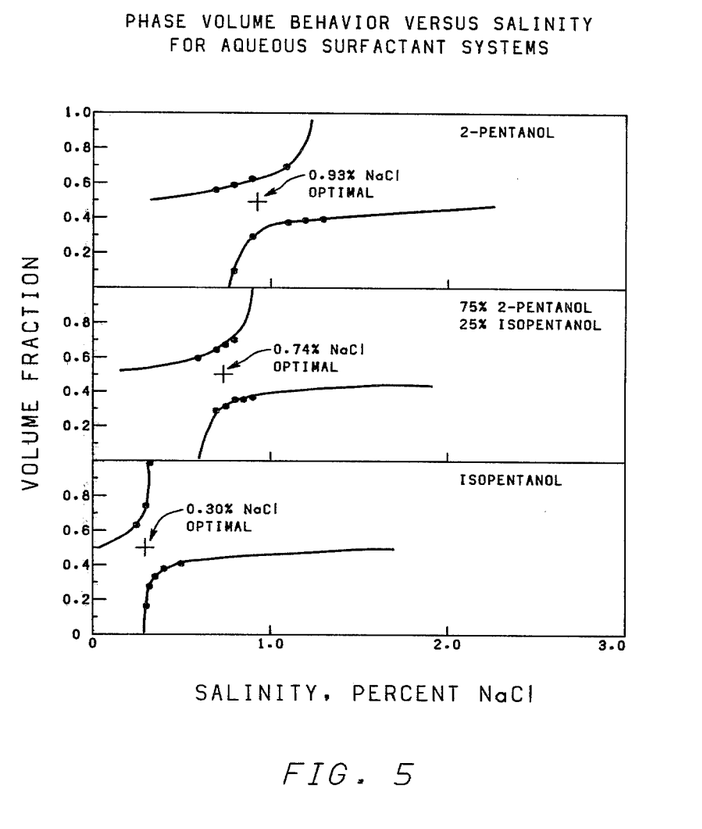
FIG. 5 is similar to FIGS. 3 and 4 utilizing additional blends of cosurfactants.

FIGS. 4 and 5 show that the same relationship exists with different pairs of cosurfactants, oil-surfactant pairs in FIG. 4 being n-decane/TRS 10-410 and in FIG. 5, n-hexadecane/TRS-LB.

Figure 6:
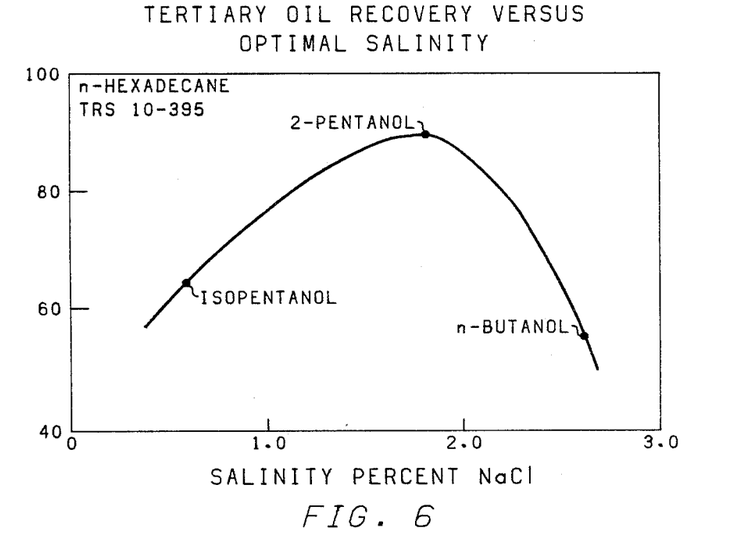
FIG. 6 is a cosurfactant scan showing the percentage oil recovery versus salinity for surfactant systems containing n-hexadecane/TRS 10-395 as the oil-surfactant pair with different cosurfactants, each run at optimal salinity.

FIG. 6 is a plot of oil recovery versus salinity for the oil-surfactant pair n-hexadecane/TRS 10-395 with each of the runs carried out at optimal salinity conditions using different cosurfactants. Thus, for instance, the first tertiary oil recovery point in FIG. 6 utilizing isopentanol as a cosurfactant comes from having made up a series of surfactant systems comprising TRS 10-395 and isopentanol at varying salinities, equilibrating them with n-hexadecane as shown in FIG. 1, and determining the one which gave equal uptake of oil and water into the microemulsion phase, i.e., the one which is at optimal salinity. The optimal salinity corresponding to the second point of FIG. 6 is similarly determined using 2-pentanol, again with a series of separate systems prepared at different salinities. Similar comments are pertinent for the runs carried out on the n-butanol system.

Figure 7:
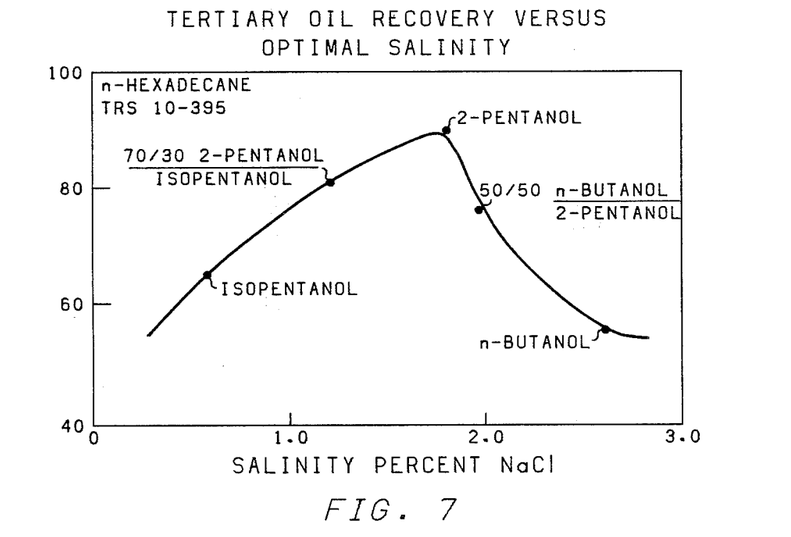
FIG. 7 is a figure similar to FIG. 6 utilizing blends of cosurfactants.

FIG. 7 is a similar plot wherein two of the surfactant systems utilized a blend of cosurfactants. Thus, as can be seen in each case, the optimal salinity values for the blends are intermediate to the optimal salinity values for systems utilizing pure cosurfactants, and the respective oil recovery values are intermediate to those of systems utilizing the pure components as cosurfactants.

Figure 8:
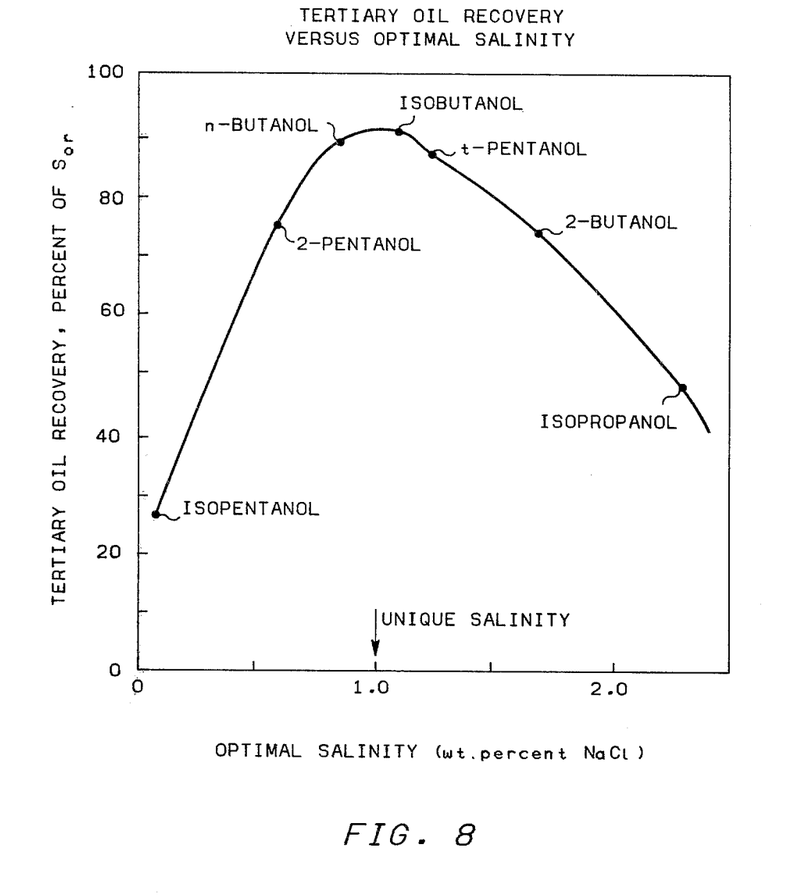
FIG. 8 is a figure similar to FIG. 7 showing the relationship between oil recovery and optimal salinity for surfactant systems containing n-decane/TRS 10-410 as the oil-surfactant pair using different cosurfactants.
Figure 9:
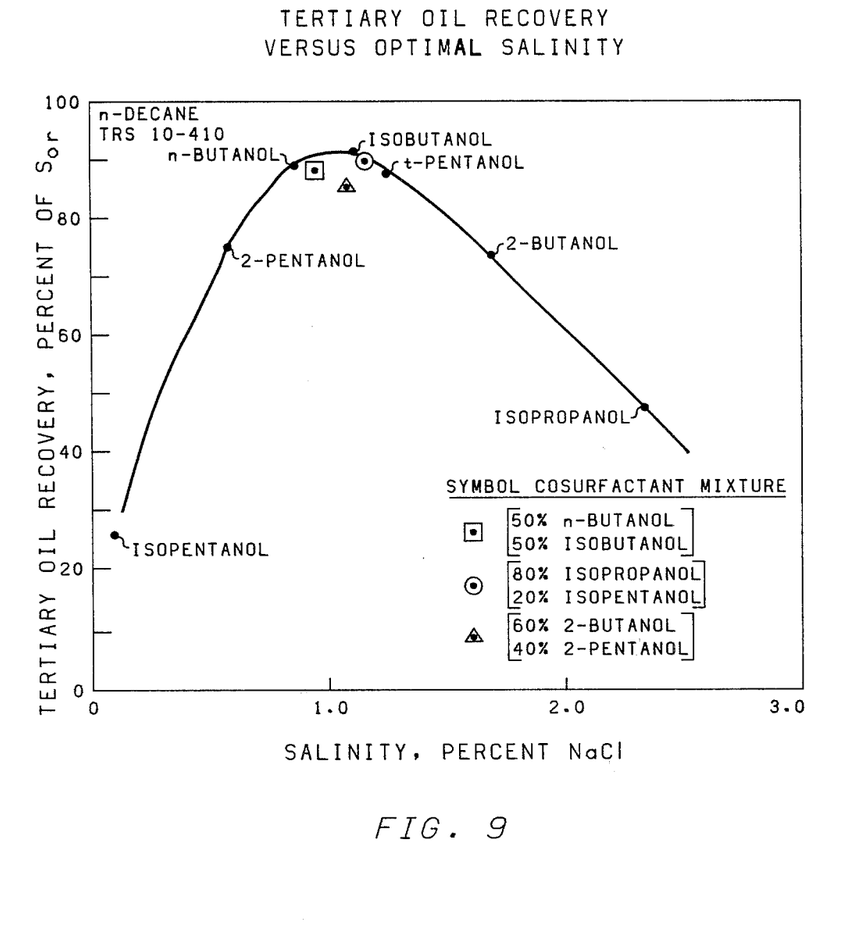
FIG. 9 is a figure similar to FIG. 8 wherein some of the surfactant systems utilized blends of cosurfactants.

It can be seen from FIGS. 6, 7 and 8 that there is a maximum in the plot of oil recovery versus salinity for surfactant systems utilizing different cosurfactants each at the optimal salinity. The unique salinity thus defined by this maximum may or may not coincide with an experimentally determined optimal salinity. As can be seen from FIGS. 3–5, a blend of cosurfactants can be used to give optimal salinities intermediate to those for the individual components and as can be seen from FIG. 7, such blends also give oil recoveries intermediate to those obtained with the individual components. In instances where no single or readily available cosurfactant exists with the proper water solubility to give an optimal salinity which coincides or essentially coincides with the unique salinity at which maximum oil recovery is obtained, a blend of cosurfactants can be utilized as shown in FIG. 9 using the relationship that increasing the water soluble component of the blend increases optimal salinity and vice versa. In this way the system can be designed using a blend so as to give an optimal salinity which is the same or essentially the same as the unique salinity at which maximum oil recovery is obtained.

Thus, in accordance with the invention, a cosurfactant blend in a specific surfactant system can give higher oil recoveries than either cosurfactant component alone in said surfactant system as shown in FIG. 9 where the isopropanol-containing system gave about 45 percent recovery, the isopentanol system about 23 percent recovery and the 80:20 isopropanol/isopentanol blend system about 90 percent recovery.

In summary, in accordance with the invention, a surfactant system having an optimal salinity corresponding to the unique salinity at which maximum oil recovery is obtained can be determined for an oil-surfactant pair by the following stepwise process (a), (b), (c), (d), (e), and (f):

(a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;

(b) preparing a series of aqueous surfactant-cosurfactant-electrolyte systems at varying electrolyte concentrations using a relatively water soluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;

(c) preparing at least one series of aqueous surfactant-cosurfactant-electrolyte systems using a cosurfactant of intermediate solubility, for instance, a mixture of the cosurfactant of (a) and (b), mixing oil to be displaced or its equivalent with the thus produced systems, allowing the resulting mixture to equilibrate and determining the salinity at which the microemulsion phase formed on said equilibration has approximately equal volumes of oil and water, thus giving the optimum salinity concentration for each surfactant-cosurfactant combination;

(d) utilizing said systems of (a), (b), and (c) to displace oil from a core under the same or similar conditions, i.e., temperature and pressure, and plotting the percentage oil recovered versus the salinity of each system;

(e) determining from said plot of (d) the optimal salinity at which maximum oil recovery is obtained, i.e., the unique salinity; and (f) using the relationship that increasing the more water soluble component of the surfactant increases the optimal salinity value and decreasing the more water soluble component of the cosurfactant decreases the optimal salinity, preparing an aqueous surfactant-cosurfactant-electrolyte system using a mixture of said cosurfactants, for instance, a mixture of (a) and (b) so as to give a surfactant system having an optimal salinity essentially corresponding to said unique salinity.

Of course, the system of (a) must be chosen so as to have an optimal salinity which is relatively low and the system of (b) chosen so as to have an optimal salinity which is relatively high so as to bracket the unique salinity. This can easily be done by using a cosurfactant having a relatively low water solubility, i.e., isopentanol for the system of (a) and a cosurfactant having a relatively high water solubility such as isopropanol for the system of (b). Generally, cosurfactants having a water solubility of 0.5 to 5 grams per 100 grams of water at room temperature can be utilized as the relatively water insoluble cosurfactant; and cosurfactants having a water solubility within the range of 10 grams per 100 grams of water at room temperature to infinity can be used for the relatively water soluble cosurfactant. Cosurfactants of intermediate solubility can be viewed as being in either the relatively water soluble or relatively water insoluble category. At most, only a small number of experimental tests must be carried out to arrive at a series of surfactant systems having optimal salinities which bracket the unique salinity. Obviously, there is no significance to the order in which these tests are carried out, i.e., the runs with the more water soluble cosurfactant can be carried out first, or the runs could be carried out starting with all of the less water soluble component and working toward all of the more water soluble or vice versa.

Cosurfactant alcohols suitable for use in the present invention contain 1 to 6 carbon atoms but most preferably contain 3 to 5 carbon atoms. Alcohol cosurfactants which can be used either individually or in various blends in the instant process include methanol, ethanol, n-propanol, isopropanol, n-butanol, isobutanol, 2-butanol, tert-butyl alcohol, n-pentanol, 2-pentanol, 3-pentanol, isopentanol, n-hexanol, isohexanol, 2-hexanol, 3-hexanol, and the like. Representative alcohol blends (wt. % basis) actually used in the experimental work included isopropanol/isopentanol (80/20), 2-butanol/2-pentanol (60/40), isobutanol/n-butanol (50/50), n-butanol/2-pentanol (40/60), 2-butanol/tert-pentanol (50/50), 2-pentanol/isopentanol (75/25), 2-butanol/tert-pentanol (30/70), n-butanol/2-pentanol (50/50), 2-pentanol/isopentanol (70/30) and 2-pentanol/isopentanol (80/20).

It is contemplated that other cosurfactants either as individual compounds or blends may be used in the present invention with the proviso that said surfactant systems comprising such cosurfactants and cosurfactant blends exhibit the desirable phase behavior as described hereinabove, viz., a three phase system (beta region) at intermediate salinites wherein interfacial tensions are at a minimum.

In addition to alcohol cosurfactants, other suitable cosurfactant materials as defined by the aforementioned proviso, include esters, amines, aldehydes, ketones, phenols, and the like such as methyl acetate, ethyl acetate, methyl propionate, ethyl propionate, N,N-diethylamine, isopentylamine, triethylamine, isobutyraldehyde, n-butanal, methyl ethyl ketone, 3-pentanone, p-cresol, and phenol. Unsaturated alcohols, e.g., such as 3-methyl-1-butenol can also be used in the instant process. The cosurfactants are polar solubilizing (to solubilize oil and water in the microemulsion) and have little or no surface active characteristics.

Cosurfactant concentrations of 0.1 to 10, preferably 1 to 7 weight percent based on the weight of the water in the surfactant system are satisfactory. A more preferred range is 1.5 to 4.5 weight percent.

Suitable surfactants (agents having substantial surface active characteristics) and electrolytes are disclosed in said Glinsmann patent. Briefly, the applicable surfactants for the surfactant system can include cationic, anionic or nonionic surfactants, and are preferably petroleum sulfonates having an average equivalent weight within the range of 375 to 500, which surfactants are disclosed in more detail in said Glinsmann patent. The surfactant will generally be present in an amount within the range of 0.1 to 10, preferably 1 to 7, more preferably 1.5 to 4.5 weight percent based on the weight of said surfactant system.

Briefly, the electrolyte of the surfactant system is preferably a monovalent metallic salt, most preferably sodium chloride, the applicable electrolytes being disclosed in detail in said Glinsmann patent. Generally, the electrolyte is present in the water of said surfactant system in an amount so as to give a brine containing 5,000 to 25,000 parts by weight total dissolved solids per million parts by weight of water, although this can vary considerably as disclosed in detail in said Glinsmann patent. Generally, a preflush, if used, will contain an electrolyte concentrations with the same range as the surfactant system, i.e., preferably about 5,000 to 25,000 parts by weight per million parts by weight of water in said preflush. The same type of electrolytes described for the surfactant system are also suitable for preflush. Generally, the same electrolyte used in the surfactant system is also used in the preflush and at the same concentration. As is known in the art, divalent ions exhibit a disproportionately high effect on surfactant systems and thus should be used in much lower concentrations. Ideally, divalent ions are avoided all together to the extent possible.

Blend ratios of more water soluble cosurfactant to less water soluble cosurfactant will vary depending on the amount needed to shift the optimal salinity to unique salinity but will generally be within the range of 1:10 to 10:1. Also, three or more cosurfactants can be blended if desired.

Phase behavior of the various surfactant systems was established by the equilibration of equal volumes (usually 25 milliliters) of oil, e.g., decane or hexadecane, and aqueous surfactant solutions as shown in FIG. 1. The volumes of the phases were recorded and plotted as a function of salinity to give typical phase-volume diagrams such as illustrated in FIG. 2a.

Within the three-phase region, there exists a salinity at which equal volumes of oil and water are solubilized into the middle microemulsion phase (see FIG. 2a). As is shown by comparing FIG. 2a with FIG. 2b, this salinity also corresponds to that at which the maximum of the coexisting tensions is minimized. This salinity is referred to as the optimal salinity for a given surfactant-/cosurfactant system.

FIG. 2c shows the trend frequently observed for oil recovery versus salinity of the system wherein the same aqueous surfactant systems used in the phase-volume and interfacial tension studies are injected into cores (typically Berea sandstone) at waterflood residual saturation of the same oil. Typically, as a function of salinity, oil recovery is maximized near the optimal salinity. FIGS. 3, 4 and 5 represent the phase-volume diagrams of surfactant systems containing specific alcohol cosurfactants and various cosurfactant alcohol blends.

In all the systems studied in this work, the aqueous surfactant systems contained 3 percent active sulfonate (by weight), 3 percent cosurfactant (single component or blend), 0.2 percent sodium tripolyphosphate, 0.1 percent sodium carbonate and varying amounts of sodium chloride for salinity adjustment. All systems were prepared in distilled water. Sodium tripolyphosphate and sodium carbonate were used as sacrificial agents to reduce surfactant adsorption in oil displacement tests and their use is optional. n-Decane and n-hexadecane were used, respectively, as representative low and high effective alkane carbon number oils. The surfactants used in this work were Witco Chemical Company petroleum sulfonates and possessed the properties shown in Table I.

TABLE I

| Witco Chemical Company Petroleum Sulfonates | | | |
|---|---|---|---|
| Ingredient (Wt. %) | TRS 10-395 | TRS 10-410 | TRS-LB |
| Active Sodium Sulfonate | 61.7 | 61.5 | 62.0 |
| Oil | 34.0 | 34.0 | 34.0 |
| Water | 4.2 | 4.4 | 4.0 |
| Inorganic Salts | 0.1 | 0.1 | NA* |
| Sulfonate | | | |
| Average Equiv. Wt. | 407 | 420 | 440 |

*NA represents not available

All cosurfactants and inorganic salts used in these studies were reagent grade. Interfacial tension measurements were made with a spinning drop apparatus.

All oil displacement tests were conducted in 3-foot long, 3-inch diameter Berea sandstone cores. The cores were prepared in the following manner: (1) saturated with optimal salinity brine, (2) flooded with the oil of interest to an irreducible brine saturation, and (3) waterflooded with brine to waterflood residual oil saturation. A surfactant flood sequence was then initiated and included: (1) a preflush slug containing sacrificial agents; (2) an aqueous surfactant slug containing a petroleum sulfonate, cosurfactant and sacrificial agents; and (3) a mobility buffer slug. All slugs were prepared in optimal salinity brine. The polymeric viscosifier concentration in the mobility buffer slug (0.5 PV) was graded back logarithmically during the displacement test. Initial polymer concentrations were adjusted to yield a viscosity of 40 cp. Table II summarizes the details of the surfactantflood sequence.

TABLE II

| Slug Sequence for Oil Displacement Tests |
|---|
| Preflush (0.60 PV) |
| 0.2% $Na_5P_3O_{10}$ |
| 0.1% $Na_2CO_3$ |
| Optimal Salinity Brine |
| Surfactant Slug (0.10 PV) |
| 3% Active Petroleum Sulfonate |
| 3% Cosurfactant (single component or blend) |
| 0.2% $Na_5P_3O_{10}$ |
| 0.1% $Na_2CO_3$ |
| Optimal Salinity Brine |
| Mobility Buffer (0.50 PV*) |
| Initial viscosity at 40 centipoise |
| Prepared in optimal salinity brine |

*A volume of mobility buffer equal to 0.5 PV was diluted continuously with brine at constant volume; i.e., polymer concentration was graded back logarithmically.

All displacement tests were conducted at 0.6 foot/day (preflush was injected at 3 feet/day). Effluent samples were analyzed for sulfonate using the standard hyamine titration procedure. Sulfonate retention was calculated from material balance. Cores were rotated (0.25 rpm) during surfactant flood tests to minimize gravity segregation effects. All phase, interfacial tension and oil displacement studies were conducted at 86° F. (30° C.).

The operability of the present invention is substantiated by the following illustrative examples.

EXAMPLE I

This example illustrates the method of the instant process in determining the unique salinity for the oil-surfactant pair n-hexadecane and Witco Chemical Company TRS 10-395 (ca. eq. wt. 407). Surfactant system designated as no. 1 comprising cosurfactant isopentanol and surfactant system designated as no. 2 comprising cosurfactant n-butanol were used in oil displacement tests, respectively, at optimal salinities of 0.51 and 2.60 to give, respectively, tertiary oil recoveries of 64.8% and 56.0. The optimal salinities of the respective surfactant systems had been determined by means of phase-volume analysis as hereinabove described. In order to determine the unique salinity for the n-hexadecane/TRS 10-395 pair, three additional optimal salinity systems were formulated. One of these surfactant systems designated as surfactant system no. 3 comprising cosurfactant 2-pentanol exhibited an optimal salinity of 1.80 intermediate between the optimal salinities for the isopentanol system and the n-butanol system (see FIG. 6). The remaining two systems were then formulated, respectively, with blends of 2-pentanol/isopentanol (70/30) and n-butanol/2-pentanol (50/50). The optimal salinites of the surfactant systems containing these blends were, respectively, 1.2 and 1.95. Oil displacement tests were carried out with the 2-pentanol systems and the aforementioned blends to give, respectively, 89.6%, 80.3% and 75.7% tertiary oil recoveries. Table III summarizes the results which were used to graphically determine the unique salinity of the n-hexadecane/TRS 10-395 pair (see FIGS. 6 and 7).

TABLE III

| Pertinent Data for Displacements of n-Hexadecane from 3-Foot Berea Cores Using 10% Surfactant Slugs Containing TRS 10-395. Displacement Data Correlate with FIGS. 6 and 7. | | | | | |
|---|---|---|---|---|---|
| Oil Type | n-Hexadecane | n-Hexadecane | n-Hexadecane | n-Hexadecane | n-Hexadecane |
| Surfactant Type (3 Wt. %) | TRS 10-395 | TRS 10-395 | TRS 10-395 | TRS 10-395 | TRS 10-395 |
| Cosurfactant Type (3 Wt. %) | isopentanol | 70% 2-pentanol 30% isopentanol | 2-pentanol | 50% n-butanol 50% 2-pentanol | n-butanol |
| Optimal Salinity (Wt. % NaCl) | 0.58 | 1.20 | 1.80 | 1.95 | 2.60 |

TABLE III-continued

Pertinent Data for Displacements of n-Hexadecane from 3-Foot Berea Cores Using 10% Surfactant Slugs Containing TRS 10-395. Displacement Data Correlate with FIGS. 6 and 7.

| Oil Type<br>Surfactant Type (3 Wt. %)<br>Cosurfactant<br>Type (3 Wt. %) | n-Hexadecane<br>TRS 10-395<br>isopent-<br>anol | n-Hexadecane<br>TRS 10-395<br>70% 2-pentanol<br>30% isopentanol | n-Hexadecane<br>TRS 10-395<br>2-pent-<br>anol | n-Hexadecane<br>TRS 10-395<br>50% n-butanol<br>50% 2-pentanol | n-Hexadecane<br>TRS 10-395<br>n-but-<br>anol |
|---|---|---|---|---|---|
| Polymer Concentration (ppm) | 2100 | 2800 | 3200 | 3200 | 3400 |
| Initial Buffer Viscosity (cp) | 38.8 | 41.8 | 41.0 | 42.0 | 40.0 |
| Core Pore Volume (cc) | 869.9 | 827.7 | 871.9 | 841.2 | 807.3 |
| Initial Oil Saturation, $S_{oi}$ (%) | 65.5 | 66.0 | 64.9 | 65.7 | 65.5 |
| Residual Oil Saturation, $S_{or}$ (%) | 36.8 | 38.0 | 36.9 | 37.0 | 37.5 |
| Specific Permeability to Brine (md) | 614.2 | 581.3 | 707.1 | — | 538.5 |
| Brine Permeability at $S_{or}$ (md) | 46.2 | 43.2 | 52.8 | 51.1 | 41.7 |
| Tertiary Oil Recovery (% $S_{or}$) | 64.8 | 80.3 | 89.6 | 75.7 | 56.0 |
| Total Oil Recovery (% $S_{oi}$) | 80.3 | 88.6 | 94.1 | 86.3 | 74.8 |
| Final Avg. Oil Saturation (% PV) | 12.9 | 7.5 | 3.8 | 9.0 | 16.5 |
| Sulfonate Retention (active lbs/A-ft) | 240 | 99 | 738 | 1146 | 1120 |

EXAMPLE II

This example illustrates the feasibility of substituting blended cosurfactants for individual cosurfactants in surfactant systems. Results have shown that oil displacement efficiency obtained with systems having a given optimal salinity and containing a cosurfactant mixture is substantially the same as that obtained with a similar system containing a single cosurfactant species at the same optimal salinity. This is illustrated by the results shown in FIGS. 8 and 9. FIG. 8 is identical to FIG. 9 except for the addition of runs wherein blended cosurfactants were used. The results plotted in FIGS. 8 and 9 are summarized in Table IV. The oil-surfactant pair used in this series was n-decane/TRS 10-410. As can be seen from Table IV, with the 8 carbon atom alcohol, 2-ethylhexanol blended with isopropanol, lower oil recoveries were obtained. The recommended carbon number range for alcohols was 2-6 carbon atoms. It is believed that the 2-ethylhexanol was preferentially retained in the core leaving isopropanol as cosurfactant.

From the results of FIG. 9 it can be seen that a 50/50 mixture of n-butanol and isobutanol is comparable in tertiary oil recovery effectiveness to a system containing isobutanol alone as the cosurfactant. In addition it can be seen that systems containing isopropanol/isopentanol (80/20 blend) and 2-butanol/2-pentanol (60/40 blend) were not only comparable in effectiveness to the $C_4$ cosurfactants but also more effective than systems containing, respectively, the individual cosurfactants of said blends.

The observed operability of cosurfactant blends in surfactant systems for tertiary oil recovery could have far-reaching significance particulary if suitable cosurfactants are readily available in large quantities as blends from a specific manufacturing process. The use of commercially available blends can decrease the cost of said cosurfactans by reducing or eliminating separation and/or purification costs. This could also reduce potential problems caused by significant volumes of by-product cosurfactant which would be generated in certain cases for the production of a given cosurfactant. This situation is exemplified by oxo process technology. For example, isobutanol and n-butanol product mixtures resulting from the hydroformylation of propylene feedstock contain varying amounts of the two alcohols as a function of operating conditions and neither alcohol can be produced without significant production of the other. The results in FIG. 9 demonstrate the potential effectiveness of such isobutanol/n-butanol blends in tertiary oil recoveries.

TABLE IV

Pertinent Data for Displacement of n-Decane from 3-Foot Berea Cores Using 10% Surfactant Slugs Containing TRS 10-410 and Various Cosurfactant Mixtures. Displacement Data Correlate with FIG. 9.

| Oil Type<br>Surfactant Type (3 Wt. %)<br>Cosurfactant<br>Type (3 Wt. %) | n-Decane[a]<br>TRS 10-410<br>50% isobutanol<br>50% n-butanol | n-Decane[a]<br>TRS 10-410<br>50% isobutanol<br>50% n-butanol | n-Decane[b]<br>TRS 10-410<br>80% isopropanol<br>20% isopentanol |
|---|---|---|---|
| Optimal Salinity (Wt. % NaCl) | 0.95 | 0.95 | 1.125 |
| Polymer Concentration (ppm) | 2250 | 2250 | 2450 |
| Initial Buffer Viscosity (cp) | 42.3 | 41.5 | 20.0 |
| Core Pore Volume (cc) | 844.3 | 828.3 | 825.5 |
| Initial Oil Saturation, $S_{oi}$ (%) | 58.8 | 63.6 | 60.0 |
| Residual Oil Saturation, $S_{or}$ (%) | 33.3 | 35.9 | 34.6 |
| Specific Permeability to Brine (md) | 699.7 | 632.3 | 694.5 |
| Brine Permeability at $S_{or}$ (md) | 74.2 | 56.0 | 65.9 |
| Tertiary Oil Recovery (% $S_{or}$) | 85.9 | 87.6 | 85.5 |
| Total Oil Recovery (% $S_{oi}$) | 93.2 | 93.0 | 91.6 |
| Final Avg. Oil Saturation (% PV) | 4.0 | 4.5 | 5.0 |
| Sulfonate Retention (active lbs/A-ft) | 671 | 1064 | 1246 |
| Oil Type<br>Surfactant Type (3 Wt. %)<br>Cosurfactant<br>Type (3 Wt. %) | n-Decane[b]<br>TRS 10-410<br>80% isopropanol<br>20% isopentanol | n-Decane<br>TRS 10-410<br>60% 2-butanol<br>40% 2-pentanol | n-Decane<br>TRS 10-410<br>83.5% isopropanol<br>16.5% 2-ethylhexanol |
| Optimal Salinity (Wt. % NaCl) | 1.135 | 1.17 | 1.00 |
| Polymer Concentration (ppm) | 2850 | 2450 | 2700 |
| Initial Buffer Viscosity (cp) | 42.0 | 43.0 | 41.4 |

TABLE IV-continued

Pertinent Data for Displacement of n-Decane from 3-Foot Berea Cores Using 10% Surfactant Slugs Containing TRS 10-410 and Various Cosurfactant Mixtures. Displacement Data Correlate with FIG. 9.

| | | | |
|---|---|---|---|
| Core Pore Volume (cc) | 848.2 | 824.1 | 871.5 |
| Initial Oil Saturation, $S_{oi}$ (%) | 61.6 | 62.4 | 60.9 |
| Residual Oil Saturation, $S_{or}$ (%) | 35.7 | 36.3 | 35.4 |
| Specific Permeability to Brine (md) | 662.0 | 636.8 | 716.4 |
| Brine Permeability at $S_{or}$ (md) | 66.1 | 49.6 | 67.5 |
| Tertiary Oil Recovery (% $S_{or}$) | 85.8 | 89.3 | 15.0 |
| Total Oil Recovery (% $S_{oi}$) | 91.8 | 93.8 | 50.6 |
| Final Avg. Oil Saturation (% PV) | 5.1 | 3.9 | 29.9 |
| Sulfonate Retention (active lbs/A-ft) | 1545 | 935 | 1537 |

[a], [b] Duplicate tests.

EXAMPLE III

Figure 10:
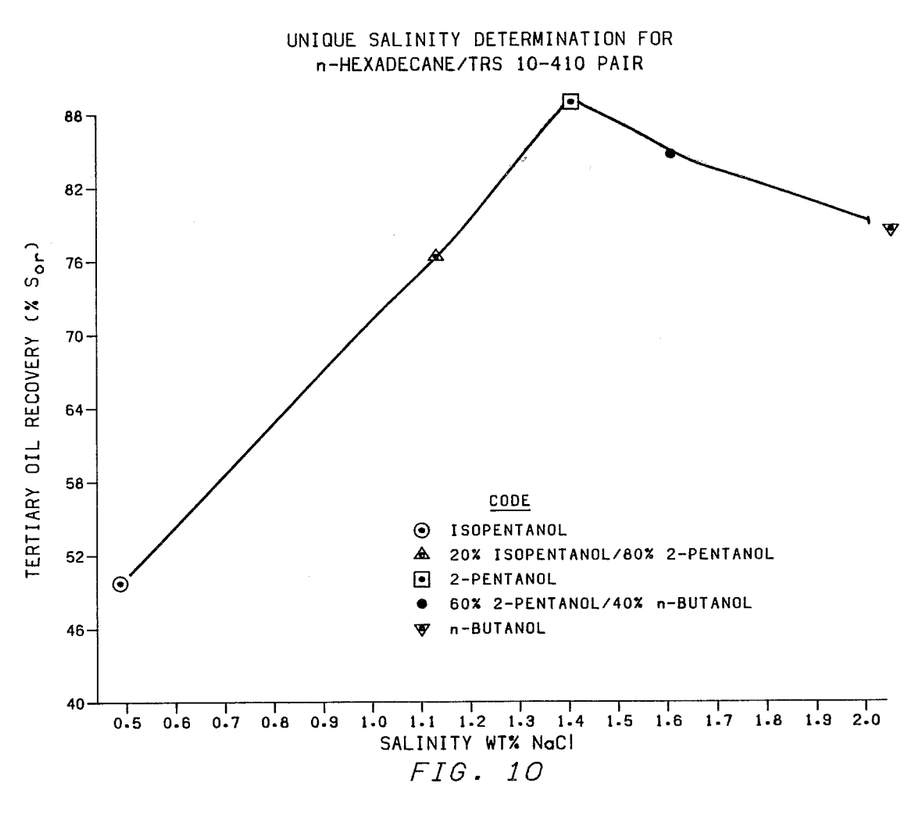
FIG. 10 is a figure similar to FIGS. 6 and 7 utilizing a different surfactant for determination of the unique salinity, all runs in FIGS. 7–10 being made at optimal salinity as in FIG. 6.

This example further illustrates the feasibility of substituting blended cosurfactants for individual cosurfactants in surfactant systems. The results plotted in FIG. 10 are summarized in Table V. The oil-surfactant pair used in this series was n-hexadecane/TRS 10-410. The use of blended cosurfactants, e.g., 2-pentanol/isopentanol (80/20) and 2-pentanol/n-butanol (60/40) were used to more accurately define the unique salinity for the n-hexadecane/TRS 10-410 pair and once again demonstrate the higher tertiary oil recovery of certain surfactant systems containing blended cosurfactants over selected surfactant systems containing cosurfactants such as individual alcohols.

TABLE V

Pertinent Data for Displacement of n-Hexadecane from 3-Foot Berea Cores Using 10% PV Surfactant Slugs Containing Various Cosurfactants

| Run No. | 1 | 2 | 3 | 4 | 5 |
|---|---|---|---|---|---|
| Surfactant (3 Wt. %) | TRS 10-410 | TRS 10-410 | TRS 10-410 | TRS 10-410 | TRS 10-410 |
| Cosurfactant (3 Wt. %) | iso-pentanol | 20% isopentanol 80% 2-pentanol | 2-pentanol | 60% 2-pentanol 40% n-butanol | n-butanol |
| Optimal Salinity (Wt. % NaCl) | 0.50 | 1.13 | 1.40 | 1.60 | 2.04 |
| Initial Buffer Viscosity (cp) | 41.8 | 43.7 | 40.5 | 42.2 | 34.0 |
| Core Pore Volume (cc) | 812 | 870 | 838 | 844 | 800 |
| Initial Oil Saturation, $S_{oi}$ (%) | 64.7 | 65.3 | 65.3 | 65.4 | 69.4 |
| Residual Oil Saturation, $S_{or}$ (%) | 36.9 | 37.2 | 36.9 | 37.0 | 38.6 |
| Specific Permeability to Brine (md) | 624 | 659.2 | 689 | 616 | 627 |
| Brine Permeability at $S_{or}$ (md) | 47 | 47.6 | 52 | 46 | 41 |
| Tertiary Oil Recovery (% $S_{or}$) | 49.7 | 75.6 | 88.0 | 83.8 | 77.8 |
| Total Oil Recovery (% $S_{oi}$) | 71.3 | 86.1 | 93.2 | 90.8 | 87.6 |
| Final Avg. Oil Saturation (% PV) | 18.5 | 9.1 | 4.44 | 6.0 | 8.6 |
| Sulfonate Retention (active lbs/A-ft) | 580 | 733 | 340 | 927 | 1060 |

The unique salinity is independent of cosurfactant concentration. For instance, with n-decane and Witco TRS 10-410, petroleum sulfonate maximum oil recovery is obtained at the unique salinity of about 1 percent with either: (1) 2.25 percent isobutanol; 3 percent t-pentanol: or 1.5 percent 2-pentanol. Thus decreasing cosurfactant concentration is equivalent to using a more water soluble cosurfactant and changes in either the cosurfactant type or concentration can be used to shift the system toward the unique salinity when somewhat water-insoluble cosurfactants are used, i.e., those having a solubility in water at room temperature of 10 g or less per 100 grams of water.

While this invention is described in detail for the purpose of illustration, it is not to be construed as limited thereby but is intended to cover all changes and modifications within the spirit and scope thereof.

We claim:

1. A method for preparing an optimized aqueous surfactant system comprising:
   (a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;
   (b) preparing a series of aqueous surfactant-cosurfactant-electrolyte systems at varying electrolyte concentrations using a relatively water soluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;
   (c) preparing at least one series of aqueous surfactant-cosurfactant-electrolyte systems using a cosurfactant having a solubility intermediate that of the cosurfactant of (a) and the cosurfactant of (b), mixing oil to be displaced or its equivalent with the thus produced systems, allowing the resulting mixture to equilibrate and determining the salinity at which the microemulsion phase formed on said equilibration has approximately equal volumes of oil and water, thus giving the optimal salinity concentration for each surfactant-cosurfactant combination;
   (d) utilizing said systems of (a), (b) and (c) at optimal salinity to remove oil from a core and plotting the percentage oil recovered versus the salinity of each system;

(e) determining from said plot of (d) the unique salinity at which maximum oil recovery is obtained; and (f) using the relationship that increasing more water soluble component of the cosurfactant increases the optimal salinity value and decreasing the more water soluble component of the cosurfactant decreases the optimal salinity, preparing an aqueous surfactant-cosurfactant-electrolyte system using a mixture of cosurfactants so as to give a surfactant system having an optimal salinity essentially corresponding to said unique salinity.

2. A method according to claim 1 wherein said relatively water insoluble cosurfactant has a water solubility within the range of 0.5 to 5 grams per 100 grams of water at room temperature and said relatively water soluble cosurfactant has a water solubility within the range of 10 grams per 100 grams of water to infinite solubility at room temperature.

3. A method according to claim 1 wherein said electrolyte comprises sodium chloride.

4. A method according to claim 1 wherein said surfactant comprises a petroleum sulfonate.

5. A method according to claim 1 wherein said surfactant consists essentially of a petroleum sulfonate having an average equivalent weight within the range of 375 to 500.

6. A method according to claim 1 wherein said cosurfactant is present in said aqueous surfactant-cosurfactant-electrolyte systems in an amount within the range of 1 to 7 weight percent based on the weight of water in said systems, and said surfactant is present in an amount within the range of 1 to 7 weight percent based on the weight of said water.

7. A method according to claim 6 wherein said cosurfactants are alcohols, said surfactant is a petroleum sulfonate having an average equivalent weight within the range of 375 to 500 and said electrolyte comprises sodium chloride.

8. A process for recovering oil from a subterranean oil-bearing reservoir comprising the steps of injecting an aqueous surfactant system into said reservoir, thereafter injecting a drive fluid into said reservoir and forcing said oil towards at least one recovery well and recovering said oil, said surfactant system corresponding to one prepared by the steps of:

(a) preparing a series of aqueous surfactant-cosurfactant-electrolyte systems at varying electrolyte concentrations using a relatively water insoluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water thus giving the optimal salinity concentration for this surfactant-cosurfactant combination;

(b) preparing a series of aqueous surfactant-cosurfactant-electrolyte systems at varying electrolyte concentrations using a relatively water soluble cosurfactant, mixing oil to be displaced or its equivalent with the thus produced systems, allowing the resulting mixtures to equilibrate and determining the salinity at which the microemulsion phase formed on said equilibration has approximately equal volumes of oil and water, thus giving the optimal salinity concentration for this surfactant-cosurfactant combination;

(c) preparing at least one series of aqueous surfactant-cosurfactant-electrolyte systems using cosurfactants with a solubility intermediate those of (a) and (b), mixing oil to be displaced or its equivalent with the thus produced systems, allowing the resulting mixture to equilibrate and determining the salinity at which the microemulsion phase formed on said equilibration has approximately equal volumes of oil and water, thus giving the optimal salinity concentration for this surfactant-cosurfactant combination;

(d) utilizing said systems of (a), (b) and (c) at optimal salinity to remove oil from a core and plotting the percentage oil recovered versus the salinity of each system;

(e) determining from said plot of (d) the unique salinity at which maximum oil recovery is obtained; and (f) using the relationship that increasing more water soluble component of the cosurfactant increases the optimum salinity value and decreasing the more water soluble component of the cosurfactant decreases the optimum salinity, preparing an aqueous surfactant-cosurfactant-electrolyte system using a mixture of cosurfactants so as to give a surfactant system having an optimal salinity essentially corresponding to said unique salinity.

* * * * *